(12) United States Patent
Adachi et al.

(10) Patent No.: US 6,612,080 B2
(45) Date of Patent: Sep. 2, 2003

(54) WINDOW MOLDING ASSEMBLY

(75) Inventors: Takao Adachi, Aichi-ken (JP); Masao Kobayashi, Aichi-ken (JP); Koichi Toshinaga, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 15 days.

(21) Appl. No.: 09/916,531

(22) Filed: Jul. 30, 2001

(65) Prior Publication Data

US 2002/0011040 A1 Jan. 31, 2002

(30) Foreign Application Priority Data

Jul. 31, 2000 (JP) ........................................ 2000-231635

(51) Int. Cl.[7] ................................................. F06B 7/00
(52) U.S. Cl. ................................................. 52/204.591
(58) Field of Search ............................ 52/716.2, 716.5, 52/717.01, 717.05, 211, 287.1, 204.591; 296/93, 146.5

(56) References Cited

U.S. PATENT DOCUMENTS

| | | | | |
|---|---|---|---|---|
| 4,349,994 A | * | 9/1982 | Maekawa | 428/122 |
| 4,864,786 A | * | 9/1989 | Harris, Jr. | 52/214 |
| 4,950,019 A | * | 8/1990 | Gross | 296/201 |
| 4,968,543 A | * | 11/1990 | Fujioka et al. | 296/93 |
| 5,070,590 A | * | 12/1991 | Fujioka et al. | 264/171.14 |
| 5,078,444 A | * | 1/1992 | Shirahata et al. | 296/201 |
| 5,114,206 A | * | 5/1992 | Yada | 296/201 |
| 5,176,420 A | * | 1/1993 | Kato | 296/93 |
| 5,344,205 A | * | 9/1994 | Yada et al. | 296/208 |
| 5,456,049 A | * | 10/1995 | Goto et al. | 296/146.15 |

FOREIGN PATENT DOCUMENTS

| | | |
|---|---|---|
| EP | 0 164 601 | * 12/1985 |
| JP | 06-211045 | 8/1994 |
| JP | 08-058364 | 3/1996 |

* cited by examiner

*Primary Examiner*—Leslie A. Braun
*Assistant Examiner*—Kofi Schulterbrandt
(74) *Attorney, Agent, or Firm*—Posz & Bethards, PLC

(57) ABSTRACT

A stable window molding assembly for sealing a gap between a window glass and a frame includes a U-shaped fastener, which has a first hook extending inward from one wall and a second hook extending inward from an opposite wall. The window molding includes a window lip, which contacts an upper surface of the window glass, and a frame lip, which contacts the frame. An arm of the window molding includes projections that engage the hooks of the fastener. Grooves are respectively formed in the arm for facilitating elastic deformation of the projections.

20 Claims, 3 Drawing Sheets

WINDOW MOLDING ASSEMBLY

BACKGROUND OF THE INVENTION

The present invention relates to a fixed window of a vehicle, such as an automobile, a ship, or an airplane, and more particularly, to a window molding arranged between a window glass and a frame, which supports the window glass.

FIG. 4 shows a first example of a prior art window molding 101. The upper side of FIG. 4 corresponds to the outside of a vehicle and the lower side of FIG. 4 corresponds to the inside of the vehicle. A window glass 104 is used, for example, as a front screen glass of the vehicle. The window molding 101 seals a gap 111 between the edge of the window glass 104 and a frame 109. The window molding 101 is made of synthetic resin and elongated. Further, the window molding 101 includes a main body 102 and an arm 103. An accommodating groove 105 extends through the main body 102 in the longitudinal direction of the window molding 101. The accommodating groove 105 receives the edge of the window glass 104. The window molding 101 includes a pair of clamping lips 106a, 106b to clamp the window glass 104, and a panel pressing lip 107 projecting from the rear side of the main body 102.

A process for mounting the window glass 104 to a roof side panel 108 of the vehicle will be described. First, a window molding 101 is attached to the edge of the window glass 104. Then, the window molding 101 and the window glass 104 are attached to the roof side panel 108. The window glass 104 is arranged on a positioning dam 112. In this state, the panel pressing lip 107 is pressed against a side surface of the frame 109, and the distal end of the arm 103 is pressed against a bottom surface of the frame 109. Adhesive 110 such as urethane sealant fills the space between a lower surface of the window glass 104, the bottom surface of the frame 109, and the arm 103 of the window molding 101. Thus, the window molding 101 seals the gap 111, and the window glass 104 and the window molding 101 are fixed to the frame 109.

FIG. 5 shows a second example of a prior art window molding 121. A fastener 129 having a generally U-shaped cross-section is fixed to a roof side panel 108 by a tape 128 that has adhesive applied to both sides. The fastener 129 includes a holding projection 130 that projects inward. The window molding 121 has a head 124. A rain gutter 125 extends from the head 124. The rain gutter 125 includes a lip 126 pressed against a window glass 104. The window molding 121 has an arm 123, which includes an engaging projection 127.

In the first prior art example, however, the window glass 104 and the roof side panel 108 have dimensional tolerances that are allowed during production. Therefore, the distance (i.e., the dimensions of the gap 111) between the edge of the window glass 104 and the roof side panel 108 varies.

In the first prior art example, if the gap 111 is large, the contact between the panel pressing lip 107 and the frame 109 is weak and the support provided by the window molding 101 is unstable. In this case, the window molding 101 may not sufficiently seal the gap 111. Additionally, enlargement of a clamping lip 106a is difficult since the dam 112 must be arranged to position the window glass 104 on the frame 109.

If the window molding 101 is moved close to the frame 109 to firmly press the panel pressing lip 107 against the roof side panel 108, the clamping lip 106b may separate from the window glass 104. This results in unstable support of the glass 104 by the window molding 101.

When the gap 111 is small, resistance produced when he window glass 104 is mounted on the frame body 109 increases. Therefore, much time and effort are needed to mount the window glass 104.

A process of mounting the window glass 104 of the second prior art example will now be described. First, the window glass 104 is arranged on the positioning dam 112 and then fixed to a frame 109 with the adhesive 110. Next, the window molding 121 is fitted into the gap 111 between the edge of the window glass 104 and the frame 109. This moves the engaging projection 127 of the window molding 121 over the holding projection 130 of the fastener 129 and engages the engaging projection 127 with the holding projection 130. As a result, the window molding 121 is fixed to the frame 109, and the gap 111 is sealed by the window molding 121.

In this state, the contact between the lip 126 and the window glass 104 elastically deforms the lip 126. The lip 126 is forced upward as viewed in FIG. 5, which separates the window molding 121 from the fastener 129. Thus, the engaging projection 127 and the holding projection 130 are firmly engaged to prevent the separation of the window molding 121.

In the second prior art example, the window molding 121 does not have a lip that is pressed against the lower side of the window glass 104. Therefore, the influence of the manufacturing and assembling tolerances of the window glass 104 and the roof side panel 108 are relatively small. However, when a person's finger or the like gets caught in the rain gutter 125, an angular moment is applied to the window molding 121. This pivots the engaging projection 127 of the arm 123 away from the holding projection 130. In other words, when a force acts in a rightward and upward direction as viewed in FIG. 5, the window molding 121 (arm 123) may be separated from the fastener 129. That is, there is a shortcoming in that the window molding 121 is unstable when forces are applied in certain directions.

SUMMARY OF THE INVENTION

It is an object of the present invention to provide a window molding assembly that is stably fitted between a window glass and a frame.

To achieve the above object, the present invention provides a window molding assembly, which is fitted in a gap between an edge of a window glass and a frame. The assembly comprises a fastener arranged in the gap. The fastener includes a first wall fixed to the frame and a second wall arranged opposite the first wall. The fastener also includes a first engaging portion formed on the first wall, and a second engaging portion formed on the second wall. The assembly further comprises a window molding held by the fastener. The molding includes a head for sealing the gap. The molding also includes a window lip extending from the head for pressing against the window glass, and a frame lip extending from the head for pressing against the frame. The molding further includes an arm extending from the head for inserting between the first wall and the second wall of the fastener. The molding yet further includes a first projection extending from the arm for engaging the first engaging portion, and a second projection extending from the arm for engaging the second engaging portion.

In a further perspective, the present invention is a window molding assembly for sealing a gap between an edge of a window glass and a frame. The window molding assembly comprises a fastener having a U-shaped cross-section fixed to the frame. The fastener includes a first wall fixed to the frame and a second wall arranged opposite the first wall. The fastener also includes a first hook projecting inward from the first wall, and a second hook projecting inward from the second wall. The window molding assembly further comprises a window molding that cooperates with the fastener. The window molding includes a head for sealing the gap. The window molding also includes a window lip extending from the head for pressing against an outer surface of the window glass, and a frame lip extending from the head for pressing against the frame. The window molding further includes an arm for fitting between the first wall and the second wall of the fastener, the arm having a first surface that faces the first wall and a second surface that faces the second wall. The window molding yet further includes a first engaging lip extending toward the frame lip from the first surface of the arm for engaging the first hook, and a second engaging lip extending toward the window lip from the second surface of the arm for engaging the second hook.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
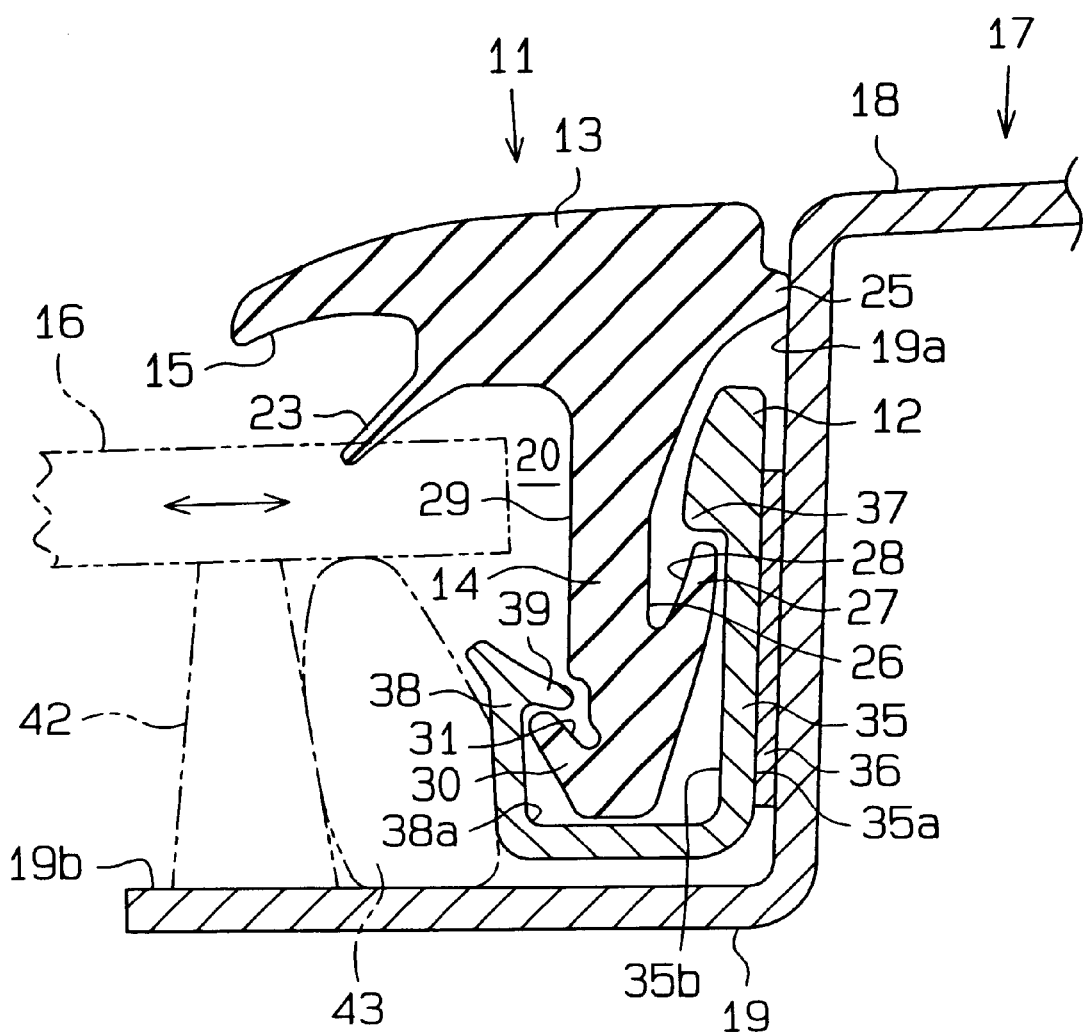
FIG. 1 is a cross-sectional view showing a window molding according to a first embodiment of the present invention.
Figure 2:
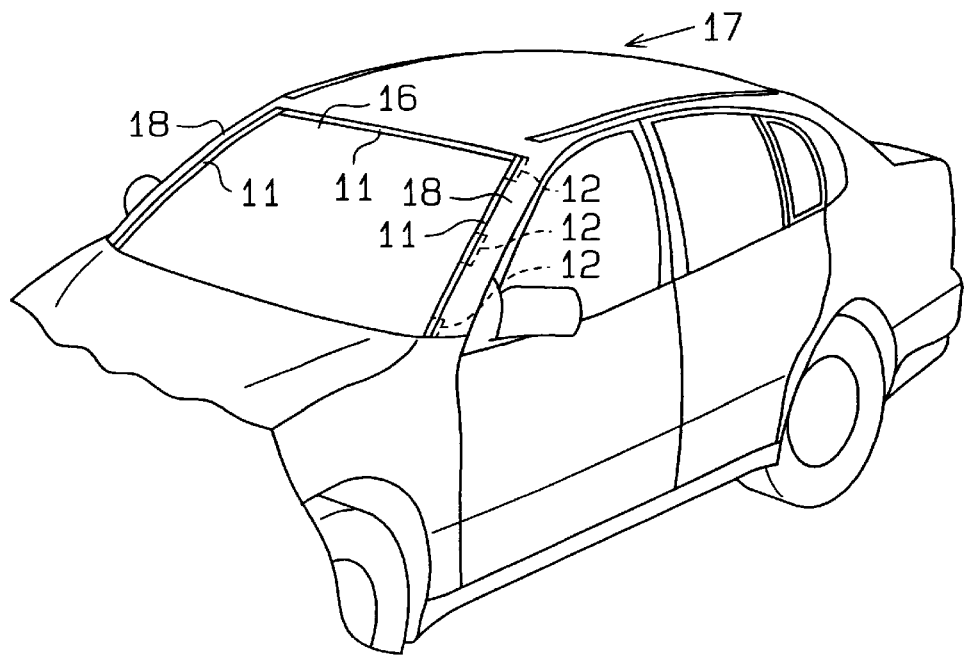
FIG. 2 is a perspective view showing an automobile to which the window molding of FIG. 1 is attached.

A window molding assembly according to a first embodiment of the present invention will now be described with reference to FIGS. 1 and 2. As shown in FIG. 2, a window molding 11 is preferably fitted in a gap 20 between an edge of a front window glass 16 and a roof side panel 18 in an automobile. The window molding assembly includes the window molding 11 and a fastener 12, which engages the window molding 11.

The window molding 11 is elongated and fits in a gap 20 between the edge of the front glass 16 and the frame 19 of the roof side panel 18. The window molding 11 has a generally T-shaped cross-section. It is preferred that the window molding 11 be made of an elastic material, such as rubber, thermoplastic elastomer, or soft polyvinyl chloride. The window molding 11 includes a head 13 and an arm 14. A groove, which serves as a rain gutter 15, is formed in the head 13. A window lip, or a glass pressing lip 23, which defines the rain gutter 15, is pressed against the front glass 16. The head 13 includes a frame lip, or a panel pressing lip 25, which is pressed against a side surface 19a of the frame 19.

A first projection, or a first engaging lip 27, which extends toward the panel pressing lip 25, is formed on a right side surface 26 of the arm 14. A resistance decreasing means, or a groove 28, is defined between the first engaging lip 27 and the right side surface 26. The groove 28 facilitates elastic deformation of the first engaging lip 27. A second projection, or a second engaging lip 30, which extends toward the glass pressing lip 23, is formed on a left side surface 29 of the arm 14. A resistance decreasing means, or a groove 31, is defined between the second engaging lip 30 and the left side surface 29. The groove 31 facilitates elastic deformation of the second engaging lip 30.

It is preferred that the fastener 12 be relatively rigid. The fastener 12 is made of a synthetic resin such as olefin resin, acrylic resin, vinyl acetate resin, halogen-containing resin, polyether resin, amino resin, polyester resin, polyamide resin, polyurethane resin, phenolic resin, or epoxy resin. The fastener 12 may also be made of a copolymer of the above synthetic resins, a cellulose resin, or a metal. The fastener 12 has a generally U-shaped cross-section. As shown in FIG. 2, the fastener 12 is one of a plurality of fasteners 12. In the first embodiment, three fasteners 12 are arranged in such a manner that one is at one end of the window molding 11, another is at the other end, and another is in the middle. Each fastener 12 is fixed to the side surface 19a of the frame 19 by a tape 36, both sides of which are covered with adhesive. Specifically, an outer surface 35a of a first wall, or right wall 35, of each fastener 12 is adhered to the side surface 19a of the frame 19 with the tape 36.

A first engaging portion, or a first hook 37, the cross-section of which is generally triangular, is formed on an inner surface 35b of a right wall 35 of each fastener 12. The first hook 37 engages the first engaging lip 27 of the window molding 11. A second engaging portion, or a second hook 39, is formed on an inner surface 38a of a second wall, or left wall 38, of the fastener 12. The second hook 39 engages the second engaging lip 30 of the window molding 11. That is, the first hook 37 and the second hook 39 define an open end of the fastener 12.

A method for attaching the window molding 11 will now be described.

First, the fasteners 12 are fixed in predetermined areas of the frame body 19 with the tape 36. A dam 42 for supporting the front glass 16 at a predetermined height is attached in the vicinity of a left end of a bottom surface 19b of the frame 19. A sealant 43 is applied between the dam 42 and each fastener 12. It is preferred that the sealant 43 be made of polyurethane, silicone, polysulfide rubber, acryl, butyl rubber, or SBR, which adhere to the fasteners 12, the front glass 16, the roof side panel 18, and the dam 42. The front glass 16 is placed on the dam 42. The sealant 43 adheres the front glass 16, the roof side panel 18, the fasteners 12, and the dam 42 to each other. Subsequently, the gap 20 is sealed by the window molding 11. Specifically, the arm 14 of the window molding 11 is inserted in each fastener 12. Consequently, the engaging lips 27, 30 respectively contact the hooks 37, 39. As a result, the elastic engaging lips 27, 30 are deformed inwardly. When the engaging lips 27, 30 pass by the associated hooks 37, 39, the engaging lips 27, 30 respectively engage the first hook 37 and the second hook 39. As a result, the window molding 11 is fixed by the fasteners 12.

In an attached state of the window molding 11, the glass pressing lip 23 is elastically pressed against the front glass 16. The glass pressing lip 23 is pushed in the upward direction of FIG. 1, which firmly engages the engaging lips 27, 30 of the window molding 11 with the associated hooks 37, 39 of the fasteners 12.

The first embodiment has advantages described below.

Figure 4:
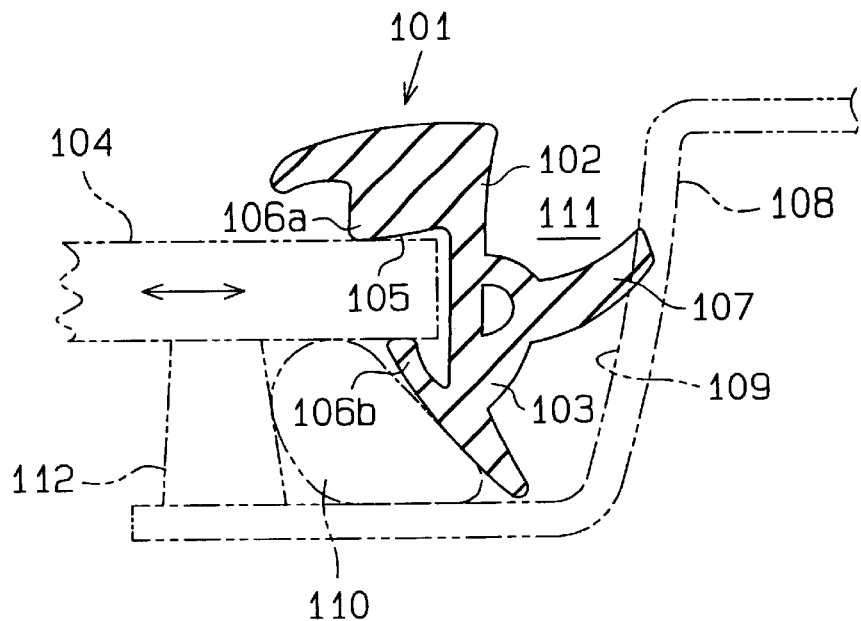
FIG. 4 is a cross-sectional view showing a first example of a prior art window molding.
Figure 5:
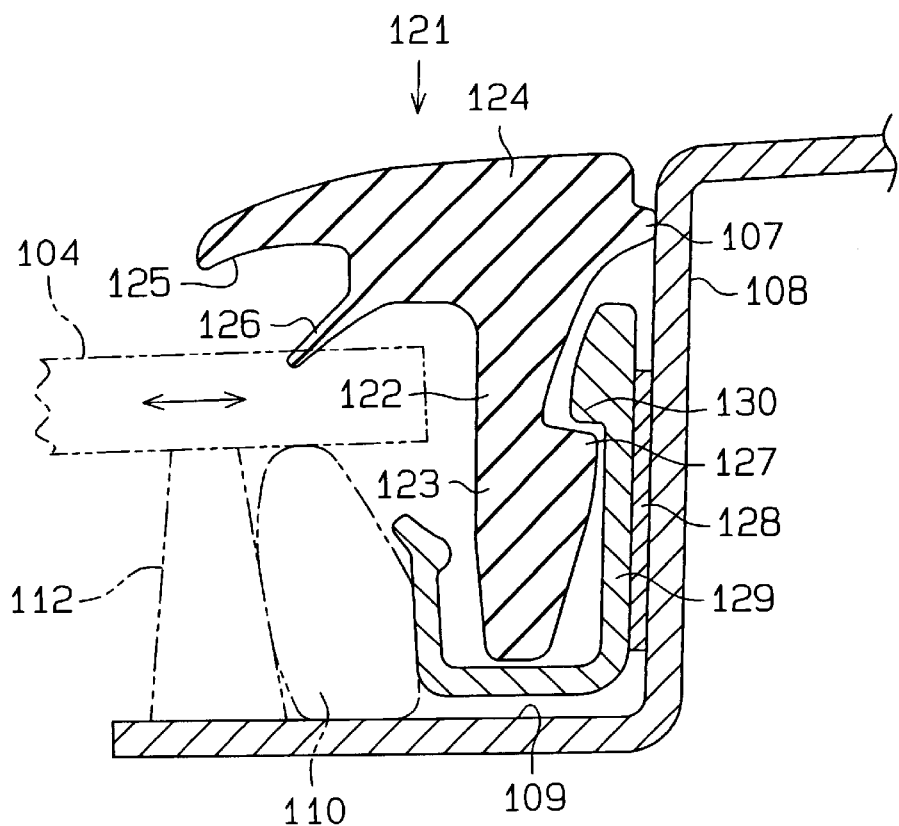
FIG. 5 is a cross-sectional view showing a second example of a prior art window molding.

(A) The engaging lips 27, 30 respectively project outward from sides 26, 29 of the arm 14 of the window molding 11. The hooks 37, 39 respectively project inward from the internal surfaces 35b, 38b of the fasteners 12. When the window molding 11 is inserted in the fastener 12, the first engaging lip 27 and the second engaging lip 30 engage the first hook 37 and the second hook 39, respectively. The engaging lips 27, 30 have the proper dimensions to engage the associated hooks 37, 39. Therefore, a large lip 106b for clamping the front glass 104, as shown in FIG. 4, is unnecessary. This eliminates the substantial influence of the dimensional tolerances of the front glass 16 and the roof side panel 18 on the window molding 11 and the fasteners 12 of the first embodiment. This provides a stable sealing structure for sealing the gap 20.

Further, the fasteners 12 clamp the window molding 11. Therefore, if a force in any direction is applied to the head 13 of the window molding 11, separation of the arm 14 from the fasteners 12 is prevented.

(B) The engaging lips 27, 30 respectively extend along the side surfaces 26, 29 of the arm 14 from a distal end of the arm 14. The distance between the engaging lip 27 and the side surface 26 gradually increases toward a proximal end of the engaging lip 27 from a basal end thereof. Likewise, the distance between the engaging lip 30 and the side surface 29 gradually increases toward a proximal end of the engaging lip 30 from a basal end thereof. Since both engaging lips 27, 30 are inwardly flexed during installation, the resistance produced when the arm 14 is engaged with the fastener 12 is relatively small. This makes it easy to fit the window molding 11 to the fasteners 12. Even if a force is applied in a direction such that the window molding 11 is pulled from the fastener 12, the engaging lips 27, 30 engage the associated hooks 37, 39, which prevents separation of the window molding 11 from the fasteners 12.

(C) If a person's finger or the like gets caught in the head 13, an angular moment may be applied to the window molding 11. However, the engagement of the engaging lips 27, 30 of the arm 14 with the associated hooks 37, 39 prevents separation of the arm 14 from the fasteners 12 even if a rightward and upward force, as viewed in FIG. 1, is applied to the arm 14. Accordingly, the window molding 11 firmly seals the gap 20.

(D) Since the window molding 11 has a rain gutter 15, a person's finger or the like may easily get caught in the rain gutter 15. However, the engagement of the engaging lips 27, 30 of the arm 14 with the associated hooks 37, 39 prevents separation of the arm 14 from the fasteners 12. Therefore, the gap 20 is firmly sealed by the window molding 11 despite the rain gutter 15 formed in the molding 11.

(E) The fasteners 12 are arranged at predetermined intervals. This eliminates time and effort needed to fit the arm 14 into a single fastener 12 that runs along the entire length of the window molding 11. This facilitates the fitting of the window molding 11.

A window molding assembly according to a second embodiment of the present invention will be described. Aspects that are different from those of the first embodiment will be mainly discussed.

Figure 3:
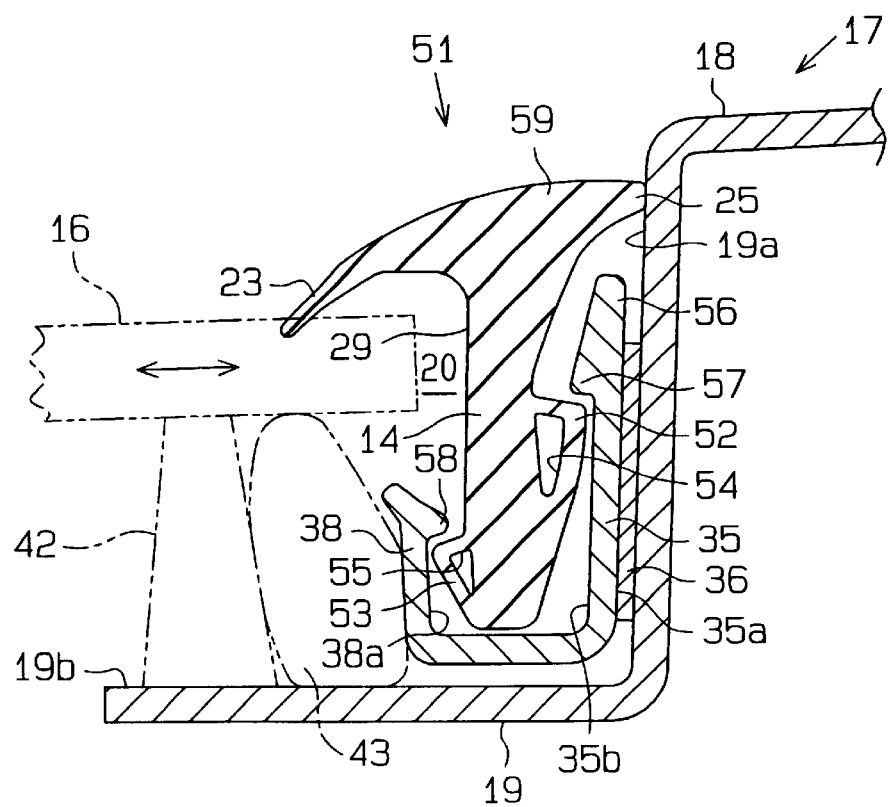
FIG. 3 is a cross-sectional view showing a window molding according to a second embodiment of the present invention.

As shown in FIG. 3, a window molding 51 includes a first hollow projection 52 and a second hollow projection 53. The first engaging lip 27 and the second engaging lip 30 according to the first embodiment are replaced by the first hollow projection 52 and the second hollow projection 53, respectively. The first hollow projection 52 has a hollow portion 54, or resistance decreasing structure, and the second hollow projection 53 has a hollow portion 55, or resistance decreasing structure. The hollow portions 54, 55 facilitate elastic deformation of the projections 52, 53 when the window molding 51 is inserted into a fastener 56.

The first hollow projection 52 and the second hollow projection 53 respectively engage a first hook 57 and a second hook 58 of the fastener 56. The first hook 57 is smaller than the first hook 37 of the first embodiment. The second hook 58 is also smaller than the second hook 39 of the first embodiment. A step between the first hook 57 and an inner surface 35b of a right wall 35 and a step between the second hook 58 and the inner surface 38a of a left wall 38 are smaller in comparison with the corresponding steps of the first embodiment. This reduces resistance produced when the window molding 51 is inserted into the fastener 56.

A head 59 of the window molding 51 is relatively small and has no rain gutter. This prevents a person's finger or the like from being easily caught in the head 59. Accordingly, occurrences of angular moments being applied to the window molding 51 decrease.

The fastener 56 extends along almost the entire length of the window molding 51. This makes the engagement of the fastener 56 and the window molding 51 firm. Accordingly, the window molding 51 is firmly held in position.

It should be apparent to those skilled in the art that the present invention may be embodied in many other specific forms without departing from the spirit or scope of the invention. Particularly, it should be understood that the present invention may be embodied in the following forms.

The number of the fasteners 12 according to the first embodiment may be two, or greater than or equal to four. However, the fastener 12 may be a single fastener that extends along the entire length of the window molding 11 as in the second embodiment.

The fastener 56 of the second embodiment may be separated into a plurality of pieces as in the first embodiment.

The arms 14, which extend along the entire length of each of the window moldings 11, 51 of both embodiments, may be replaced by a plurality of arms that are spaced apart at predetermined intervals.

At least one of the hollow spaces 54, 55 of the second embodiment may be omitted.

The fasteners 12 of the first embodiment and the fastener 56 of the second embodiment are fixed to the frame 19 with the tape 36. However, adhesive, clips, screws, retainers, welding, soldering, or the like may be used instead of the tape 36. Also, the fasteners 12, 56 may be fixed to the bottom surface 19b of the roof side panel 18.

In the first embodiment, the arm 14 of the window molding 11 includes the engaging lips 27, 30, which are elastically deformable. In the second embodiment, the arm 14 of the window molding 51 includes the hollow projections 52, 53, which are elastically deformable. However, either the wall 35 of the fastener 12 and the wall 38 of the fastener 56 or the pair of hooks 37, 39 and the pair of hooks 57, 58 may be elastically deformable.

Each window molding 11, 51 is arranged between the edge of the front glass 16 and the roof side panel 18 of the automobile. However, the window moldings 11, 51 may be arranged between an upper edge and a lower edge of the front glass 16 and associated portions of the body of the automobile.

Each window molding 11, 51 is used for the front glass 16. However, the moldings 11, 51 may be used for other fixed windows, such as a rear window, a quarter window, and a fixed-type sun roof.

Each window molding 11, 15 is attached to an automobile 17. However, they may be attached to a fixed window of other vehicle such as a ship or an airplane.

The present examples and embodiments are to be considered as illustrative and not restrictive, and the invention is not to be limited to the details given herein, but may be modified within the scope and equivalence of the appended claims.

What is claimed is:

1. A window molding assembly, which is filled in a gap between an edge of a window glass and a frame, wherein the window glass is supported at a predetermined height from the frame by a dam that is attached to the frame, the assembly comprising:
   a fastener arranged in the gap, wherein the fastener includes:
      a first wall;
      a fixing member for fixing the first wall on the frame;
      a second wall arranged opposite the first wall, wherein a space is formed between the second wall and the dam to receive a sealant;
      a first engaging portion formed on the first wall; and
      a second engaging portion formed on the second wall; and
   a window molding held by the fastener, wherein the molding includes:
      a head for sealing the gap;
      a window lip extending from the head for pressing against the window glass;
      a frame lip extending from the head for pressing against the frame;
      an arm extending from the head, wherein the arm is inserted between the first wall and the second wall of the fastener;
      a first projection extending from the arm for engaging the first engaging portion; and
      a second projection extending from the arm for engaging the second engaging portion.

2. The assembly according to claim 1, wherein the arm includes a resistance decreasing structure for facilitating elastic deformation of one of the projections to decrease resistance between the arm and the fastener when the arm is fitted into the fastener.

3. The assembly according to claim 2, the resistance decreasing structure includes a groove defined by the first or the second projection and the arm.

4. The assembly according to claim 1, wherein the window molding further includes a gutter formed in the head and extending along the window lip.

5. The assembly according to claim 1, wherein the fastener is one of a plurality of fasteners, and the fasteners are fixed to the frame at predetermined intervals.

6. The assembly according to claim 1, wherein the window molding extends along the edge of the window glass, and the fastener extends substantially along the entire length of the window molding.

7. The assembly according to claim 1, wherein the fixing member includes a two-sided adhesive tape.

8. The assembly according to claim 1, wherein the window molding is configured so that only the window lip thereof contacts the window glass.

9. The assembly according to claim 1, wherein the second engaging portion is located at the end portion of the second wall and is spaced a predetermined distance from the window glass.

10. The assembly according to claim 1, wherein the first and second projections include first and second hollow portions, respectively for facilitating elastic deformation thereof during assembly.

11. A window molding assembly, which is fitted in a gap between an edge of a window glass and a frame, the assembly comprising:
   a fastener arranged in the gap, wherein the fastener includes:
      a first wall fixed to the frame;
      a second wall arranged opposite the first wall;
      a first engaging portion formed on the first wall; and
      a second engaging portion formed on the second wall; and
   a window molding held by the fastener, wherein the molding includes:
      a head for sealing the gap;
      a window lip extending from the head for pressing against the window glass;
      a frame lip extending from the head for pressing against the frame;
      an arm extending from the head, wherein the arm is inserted between the first wall and the second wall of the fastener;
      a first projection extending from the arm for engaging the first engaging portion; and
      a second projection extending from the arm for engaging the second engaging portion; wherein the arm includes a resistance decreasing structure for facilitating elastic deformation of one of the projections to decrease resistance between the arm and the fastener when the arm is fitted into the fastener, and wherein the resistance decreasing structure includes a hollow portion formed in at least either the first or the second projection.

12. A window molding assembly fitted in a gap between an edge of a window glass and a frame, wherein the glass is supported at a predetermined height from the frame by a dam that is attached to the frame, the assembly comprising:
   a fastener having a U-shaped cross-section fixed to the frame, wherein the fastener includes:
      a first wall;
      a fixing member for fixing the first wall to the frame;
      a second wall arranged opposite the first wall, wherein a space is formed between the second wall and the dam to receive a sealant;
      a first hook projecting inward from the first wall; and
      a second hook projecting inward from the second wall; and
   a window molding that cooperates with the fastener, wherein the window molding includes:
      a head for sealing the gap;
      a window lip extending from the head for pressing against an outer surface of the window glass;
      a frame lip extending from the head for pressing against the frame;
      an arm for fitting between the first wall and the second wall of the fastener, the arm having a first surface that faces the first wall and a second surface that faces the second wall;
      a first engaging lip extending toward the frame lip from the first surface of the arm, wherein the first engaging lip engages the first hook; and
      a second engaging lip extending toward the window lip from the second surface of the arm, wherein the second engaging lip engages the second hook.

13. The window molding assembly according to claim 12, wherein the window molding further includes a first groove formed between the first surface of the arm and the first engaging lip and a second groove formed between the second surface of the arm and the second engaging lip.

14. The window molding assembly according to claim 12, wherein the window molding is made of an elastic material and the fastener has a relatively high rigidity.

15. The window molding assembly according to claim 12, wherein the window molding is configured so that only the window lip thereof contacts the window glass.

16. The window molding assembly according to claim 12, wherein the second engaging portion is located at an end portion of the second wall and is spaced a predetermined distance from the window glass.

17. The window molding assembly according to claim 12, wherein the first and second projections include first and second hollow portions, respectively for facilitating elastic deformation thereof during assembly.

18. A window molding assembly, which is fitted in a gap between an edge of a window glass and a frame, the assembly comprising:
   a fastener having a U-shaped cross-section fixed to the frame, wherein the fastener includes:
      a first wall fixed to the frame;
      a second wall arranged opposite the first wall;
      a first hook projecting inward from the first wall; and
      a second hook projecting inward from the second wall; and
   a window molding that cooperates with the fastener, wherein the window molding includes:
      a head for sealing the gap;
      a window lip extending from the head for pressing against an outer surface of the window glass;
      a frame lip extending from the head for pressing against the frame;
      an arm for fitting between the first wall and the second wall of the fastener;
      a first hollow projection extending from the arm, wherein the first hollow projection engages the first hook; and
      a second hollow projection extending from the arm, wherein the second hollow projection engages the second hook.

19. The window molding assembly according to claim 18, wherein the window molding is made of an elastic material and the fastener has a relatively high rigidity.

20. A structure for installing a window glass and a window molding assembly to a frame, wherein the window molding assembly is fitted in a gap between an edge of the window glass and the frame, the structure comprising:
   a dam attached to the frame for supporting the window glass at a predetermined height from the frame;
   a fastener arranged in the gap, wherein the fastener includes:
      a first wall;
      a fixing member for fixing the first wall to the frame;
      a second wall arranged opposite the first wall, wherein a space is formed between the second wall and the dam,
      a first engaging portion formed on the first wall; and
      a second engaging portion formed on the second wall;
   a window molding held by the fastener, wherein the molding includes:
      a head for sealing the gap;
      a window lip extending from the head for pressing against the window glass;
      a frame lip extending from the head for pressing against the frame;
      an arm extending from the head, wherein the arm is inserted between the first wall and the second wall of the fastener;
      a first projection extending from the arm for engaging the first engaging portion; and
      a second projection extending from the arm for engaging the second engaging portion; and
   a sealant applied between the second wall and the dam to adhere the dam, the fastener, the window glass and the frame to each other.

* * * * *